(12) United States Patent
Wang et al.

(10) Patent No.: US 9,052,779 B2
(45) Date of Patent: Jun. 9, 2015

(54) DISPLAY AND METHOD OF DETERMINING A POSITION OF AN OBJECT APPLIED TO A THREE-DIMENSIONAL INTERACTIVE DISPLAY

(75) Inventors: Guo-Zhen Wang, Hsin-Chu (TW);
An-Thung Cho, Hsin-Chu (TW);
Ming-Ching Ma, Hsin-Chu (TW);
Jiun-Jye Chang, Hsin-Chu (TW);
Shuan-Yu Tung, Hsin-Chu (TW);
Yi-Pai Huang, Hsin-Chu (TW);
Min-Feng Chiang, Hsin-Chu (TW);
Wei-Lung Liao, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 357 days.

(21) Appl. No.: 13/587,937

(22) Filed: Aug. 17, 2012

(65) Prior Publication Data
US 2013/0044093 A1 Feb. 21, 2013

(30) Foreign Application Priority Data
Aug. 18, 2011 (TW) .............................. 100129600 A (51) Int. Cl.
*G06F 3/042* (2006.01)

(52) U.S. Cl.
CPC .... *G06F 3/0421* (2013.01); *G06F 2203/04101* (2013.01)

(58) Field of Classification Search
CPC .............................. G06F 3/0421; G06F 3/0304
USPC ......................................................... 345/175
See application file for complete search history.

(56) References Cited

U.S. PATENT DOCUMENTS

| 6,710,770 | B2 | 3/2004 | Tomasi | |
|---|---|---|---|---|
| 6,762,747 | B2 | 7/2004 | Fujioka | |
| 8,605,057 | B2 | 12/2013 | Yang | |
| 2003/0001825 | A1* | 1/2003 | Omura et al. | 345/173 |
| 2005/0190162 | A1* | 9/2005 | Newton | 345/175 |
| 2006/0103637 | A1* | 5/2006 | Yamaguchi et al. | 345/175 |
| 2006/0227120 | A1* | 10/2006 | Eikman | 345/175 |
| 2008/0122803 | A1* | 5/2008 | Izadi et al. | 345/175 |
| 2008/0150848 | A1* | 6/2008 | Chung et al. | 345/82 |
| 2008/0211787 | A1* | 9/2008 | Nakao et al. | 345/175 |
| 2009/0058829 | A1 | 3/2009 | Kim | |
| 2010/0060611 | A1* | 3/2010 | Nie | 345/175 |
| 2010/0225617 | A1* | 9/2010 | Yoshimoto et al. | 345/175 |

(Continued)

FOREIGN PATENT DOCUMENTS

CN 101819490 A 9/2010
CN 101963716 A 2/2011

*Primary Examiner* — Claire X Pappas
*Assistant Examiner* — Robert Stone
(74) *Attorney, Agent, or Firm* — Winston Hsu; Scott Margo (57) ABSTRACT

A display includes a backlight source, display panel, first light source, and controller. The display panel includes a sensor array for sensing first reflection light generated from an object reflecting first detection light. The first detection light is generated by the backlight source for locating a coordinate of a projection point of the object on the display panel. The first light source is disposed in a first side of the display panel, for repeatedly transmitting second detection light of different transmitting angles to the object at different time to generate a second reflection light. The second reflection light is sensed by the sensor array. The controller is for performing a corresponding operation according to a transmitting angle of the first light source and the coordinate of the projection point when brightness value of the reflective light is substantially greater than a predict value.

17 Claims, 12 Drawing Sheets

(56) References Cited

U.S. PATENT DOCUMENTS

2010/0245292 A1* 9/2010 Wu .............................. 345/175
2010/0315382 A1* 12/2010 Kurihara et al. ............. 345/175
2011/0148816 A1* 6/2011 Jhu et al. ....................... 345/175
2011/0148859 A1 6/2011 Huang
2011/0157097 A1* 6/2011 Hamada et al. ................ 345/175
2011/0267317 A1* 11/2011 Tsuda ........................... 345/175

* cited by examiner

DISPLAY AND METHOD OF DETERMINING A POSITION OF AN OBJECT APPLIED TO A THREE-DIMENSIONAL INTERACTIVE DISPLAY

CROSS-REFERENCE TO RELATED APPLICATIONS

This application claims the benefit of Taiwan Patent Application No. 100129600, now Taiwan Patent No. 1454996, filed Aug. 18, 2011, and incorporated herein by reference in its entirety.

BACKGROUND

1. Field of the disclosure

The present invention is related to a display device and a method of determining a position of an object applied to a three-dimensional interactive display, and more particularly, to a display device utilizing a backlight source and at least one first light source to locate a position of an object and a method of determining a position of an object applied to a three-dimensional interactive display.

2. Description of the Prior Art

Figure 1:
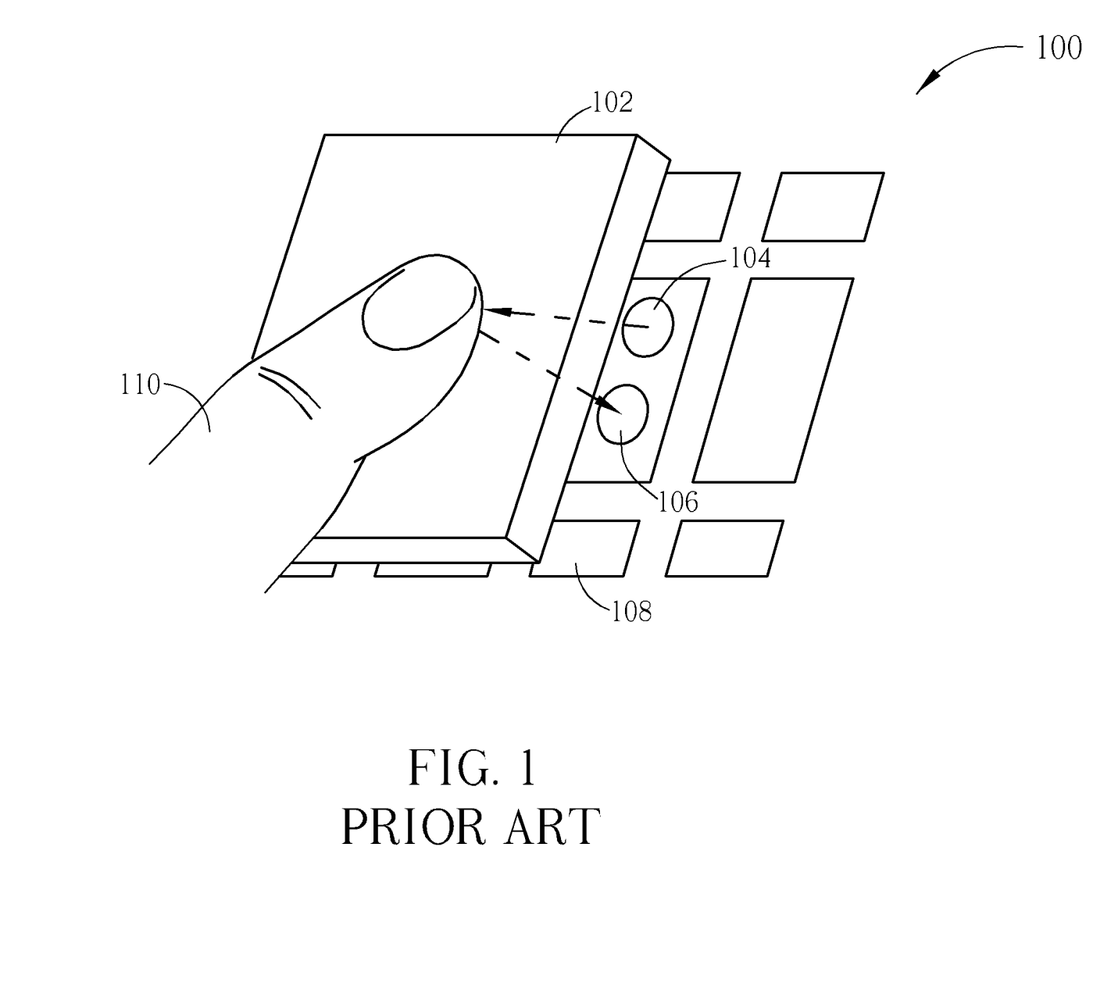
FIG. 1 and FIG. 2 are diagrams illustrating conventional interactive display devices.
Figure 2:
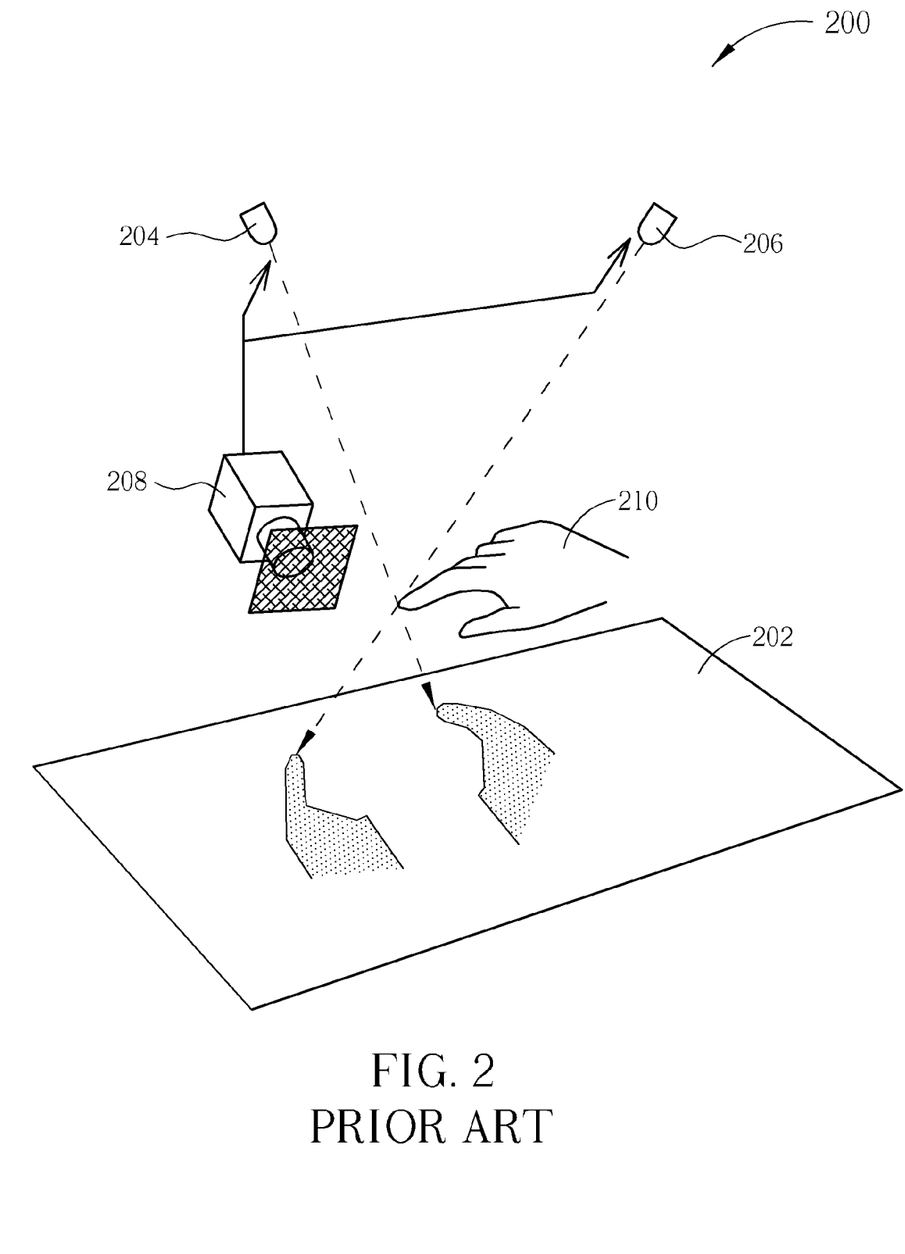

Please refer to FIG. 1 and FIG. 2. FIG. 1 and FIG. 2 are diagrams illustrating conventional interactive display devices. As shown in FIG. 1 an interactive display device 100 comprises a liquid crystal display panel 102, a light transmitter 104, a light receiver 106 and a light sensor 108, where the light transmitter 104, the light receiver 106 and the light sensor 108 are disposed below the liquid crystal display panel 102. When an object 110 comes in contact with the liquid crystal display panel 102, the object 110 reflects detection light from the light transmitter 104 and the light receiver 106 then receives light reflected by the object 110. The light sensor 108 calculates a coordinate of the object 110 on the liquid crystal display panel 102 according to the reflective light received by the light receiver 106.

As shown in FIG. 2, an interactive display device 200 comprises a liquid crystal display panel 202, light transmitters 204 and 206, and an image sensor 208. The light transmitters 204 and 206 comprise three on-and-off statuses, e.g. both of the light transmitters 204 and 206 are turned off; the light transmitter 204 is turned on while the light transmitter 206 is turned off; or, the light transmitter 206 is turned on while the light transmitter 204 is turned off. The image sensor 208 operates repeatedly in-sync with the three on-and-off statuses of the light transmitters 204 and 206, for capturing an image on the liquid crystal display panel 202 caused by the object 210. Therefore, the interactive display device 200 can then calculate a three-dimensional coordinate of the object 210 corresponding to the liquid crystal display panel 202, according to a difference between two images captured by the image sensor 208.

In summary, the interactive display device 100 can only provide a two-dimensional coordinate of the object 110 corresponding to the liquid crystal display panel 102. Although the interactive display device 200 can provide a three-dimensional coordinate of the object 210 corresponding to the liquid crystal display panel 202, the light transmitters 204 and 206 and the image sensor 208 are disposed outside of the liquid crystal display panel 202. Consequently, the interactive display device 200 possesses a relatively large size with limited operating range.

SUMMARY

An embodiment of the present invention discloses a display. The display comprises a backlight source, a display panel, a first light source and a controller. The display panel is disposed above the backlight source. The display panel comprises a sensor array. The sensor array is for sensing first reflection light, wherein the first reflection light is generated from an object reflecting first detection light, wherein the first detection light is generated by the backlight source, and the first reflection light is for locating a coordinate of a projection point of the object on the display panel. The first light source is disposed in a first side of the display panel, for repeatedly transmitting second detection light of different transmitting angles to the object at different time to generate a second reflection light, wherein the second reflection light is sensed by the sensor array. The controller is for performing a corresponding operation according to a transmitting angle of the first light source and the coordinate of the projection point, when brightness value of the reflective light is substantially greater than a predict value.

Another embodiment of the present invention discloses a method of determining a position of an object. The method comprises a backlight source transmitting first detection light in a first duration; a sensor array locating a coordinate of a projection point of the object on a display panel according to first reflection light generated from the object reflecting the first detection light; at least one first light source transmitting at least one second detection light to the object in a second duration after the first duration, for generating at least one second reflection light, wherein the at least one first light source is disposed in at least one side of the display panel; the sensor array sensing at least one second reflection light in the second duration; and performing a corresponding operation in the second duration, according to at least one transmitting angle of the at least one first light source and the coordinate of the projection point when brightness value of the reflective light is substantially greater than a predict value.

These and other objectives of the present invention will no doubt become obvious to those of ordinary skill in the art after reading the following detailed description of the preferred embodiment that is illustrated in the various figures and drawings.

DETAILED DESCRIPTION

Figure 3A:
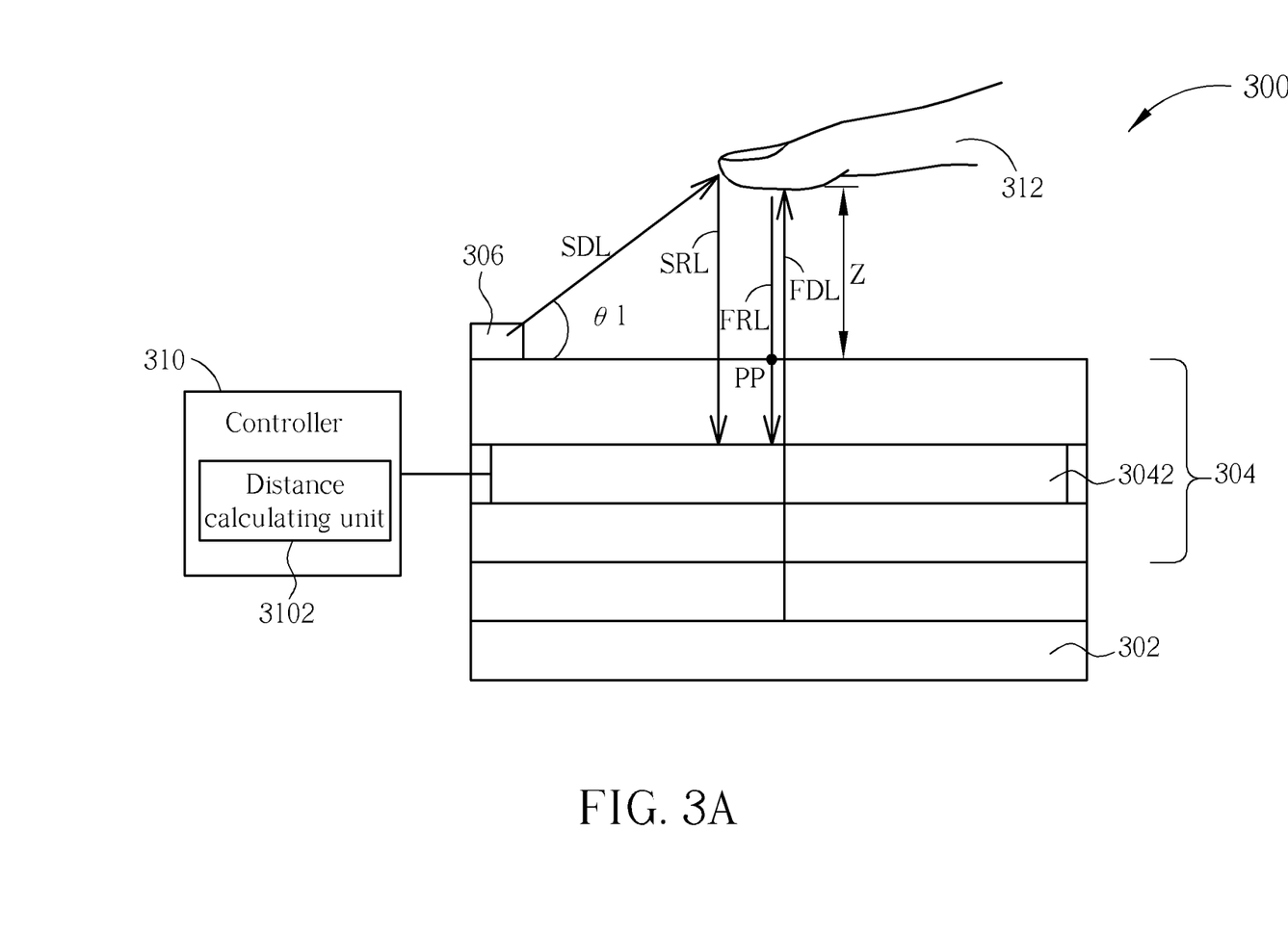
FIG. 3A is a diagram illustrating a display device according to an embodiment of the present invention.

Please refer to FIG. 3A. FIG. 3A is a diagram illustrating a display device 300 according to an embodiment of the present invention. The display device 300 comprises a backlight source 302, a display panel 304, a first light source 306 and a controller 310. The backlight source 302 can be an infrared light source or a visible light source, etc. The display panel 304 is disposed above the backlight source 302, and comprises a sensor array 3042. The backlight source 302 generates and transmits first detection light FDL to an object 312, and first reflection light FRL is generated according to the object 312 reflecting the first detection light FDL. The sensor array 3042 is embedded in the display panel 304, for example, for sensing the first reflection light FRL. The sensor array 3042 also utilizes the first reflection light FRL to locate a coordinate PP of a projection point of the object 312 on the display panel 304. The first light source 306 is disposed in proximity to a first side of the display panel 304, for repeatedly transmitting second detection light SDL of different transmitting angles (e.g. about 5-70 degrees, but not limited to these) above the display panel 304 to the object 312, and generates second reflection light SRL. One preferred default transmitting angle is 50 degrees, for the sensor array 3042 to sense the reflective light, for example, generated by the second reflection light SRL (which is generated through the object 312) on the display panel 304.

A predict value can be the maximum brightness value or average brightness value, for example, obtained by the sensing array 3042 integrating brightness of the object 312 reflecting the second reflection light SRL to the display panel 304. The first light source 306 can be an infrared light source or a light source of visible light, etc. The transmitting angle of the present invention is not limited to about 5-70 degrees. A sensing frequency of the sensing array 3042 can be the same as a transmitting frequency of the first light source 306 transmitting the second detection light SDL.

The controller 310 comprises a distance calculating unit 3102. The distance calculating unit 3102 is for calculating a distance Z between the object 312 and the display panel 304 when the sensing array 3042 has sensed the generation of the reflective light (e.g. when brightness value of the reflective light is substantially greater than the predict value) according to a transmitting angle θ1 of the first light source 306, the coordinate PP of the projection point and trigonometric theorem. In other words, the distance Z is the product of multiplying "horizontal component x of the coordinate PP of the projection point" by "tan θ1".

Therefore, the controller 310 can perform a corresponding operation according to the coordinate PP of the projection point of the object 312 on the display panel 304 and the distance Z of the object 312 relative to the display panel 304. Furthermore, when the first detection light FDL is turned on, the second detection light SDL is turned off, and when the second detection light SDL is turned on, the first detection light FDL is turned off, meaning the first detection light FDL and the second detection light SDL are not turned on or turned off at the same time.

Figure 3B:
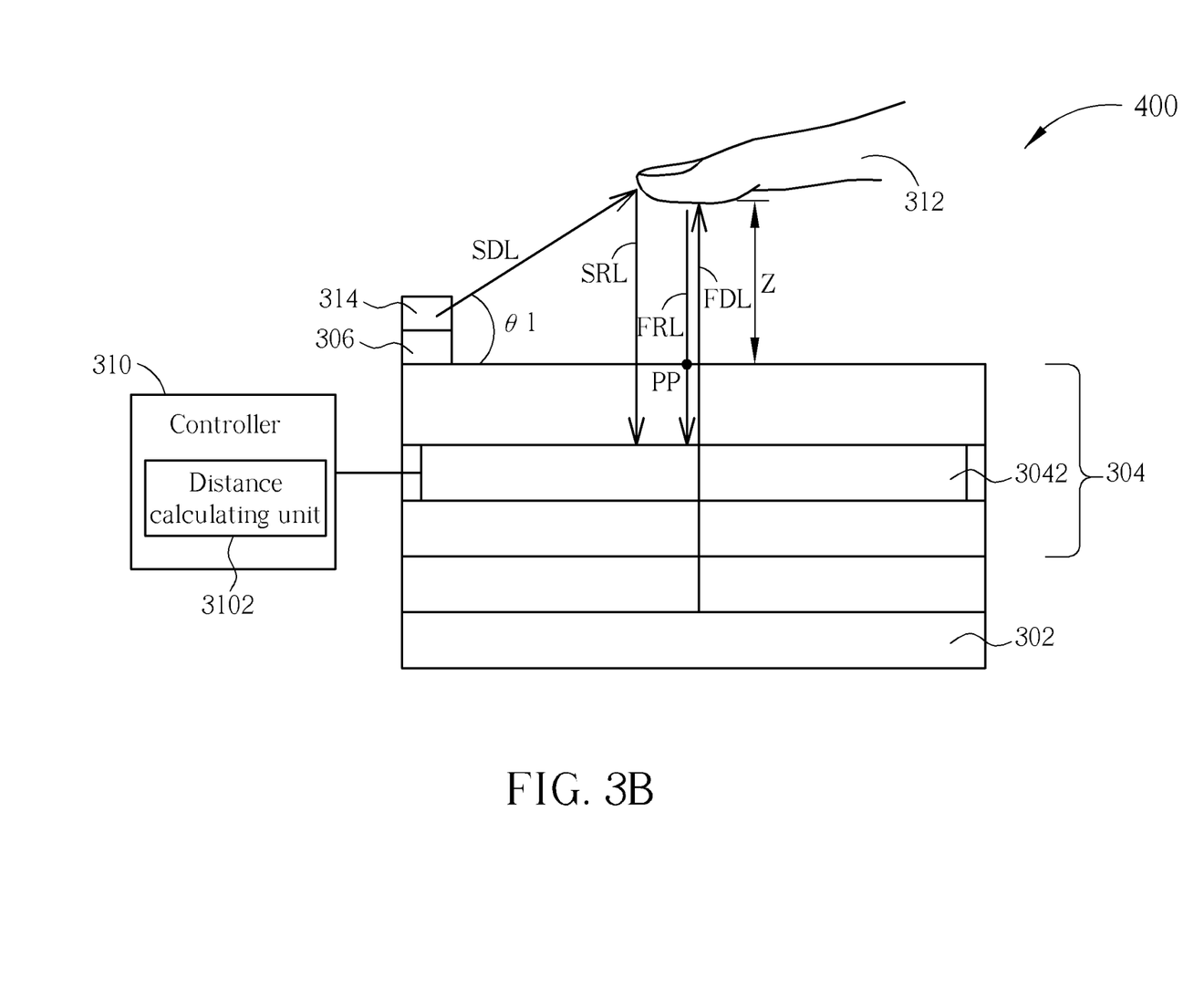
FIG. 3B is a diagram illustrating a display device according to another embodiment of the present invention.

Please refer to FIG. 3B. FIG. 3B is a diagram illustrating a display device 400 according to another embodiment of the present invention. One difference between the display device 400 and the display device 300 is that the display device 400 further comprises an optical modulator 314. The optical modulator 314 is disposed above the first light source 306, for altering a transmitting angle of the second detection light SDL generated by the first light source 306. The optical modulator 314 can be a periodic diffraction grating, a micro electro mechanical system (MEMS) or a liquid crystal lens device, etc. Other operation principles of the display device 400 are similar to the display device 300, so the related description is omitted hereinafter.

Figure 3C:
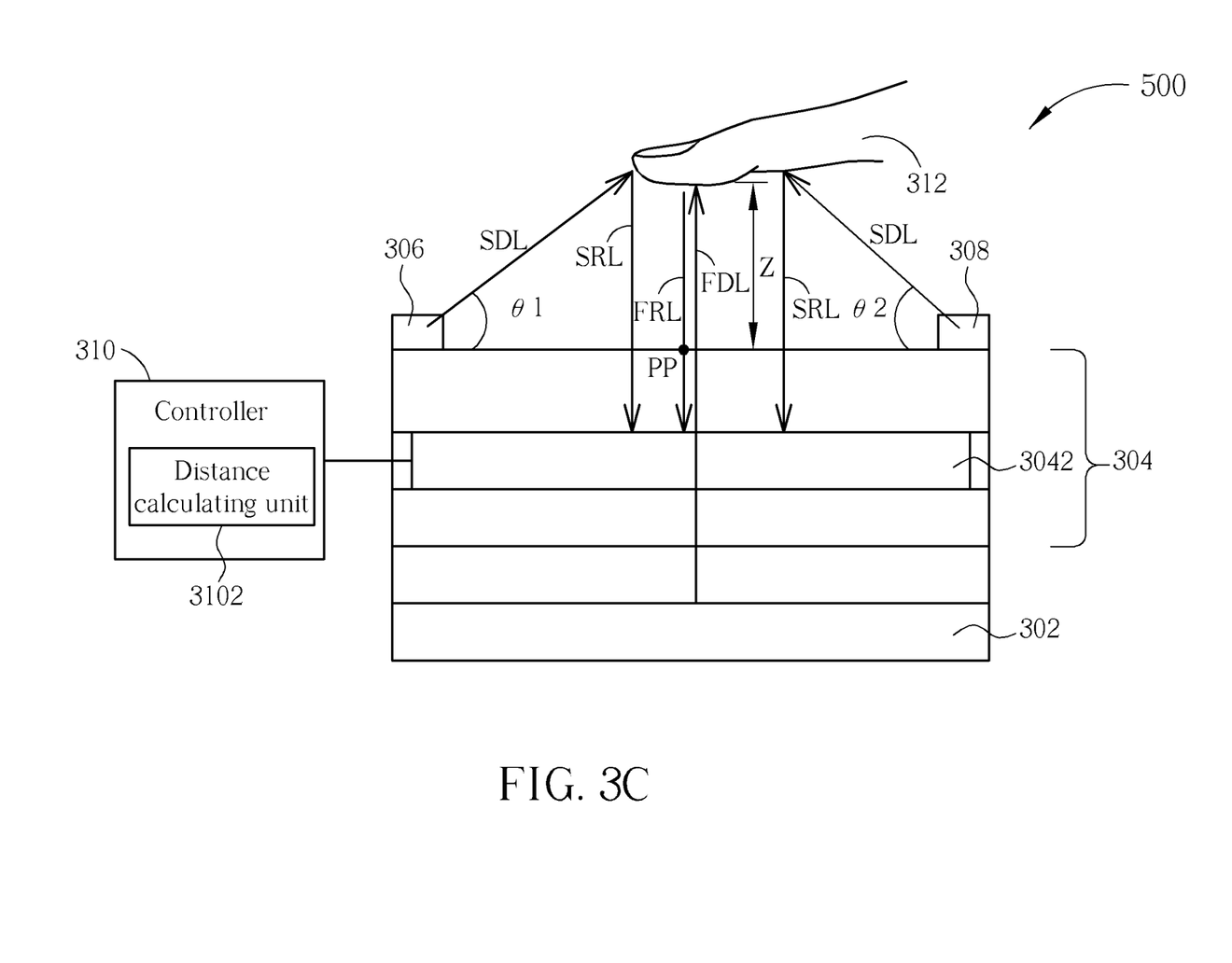
FIG. 3C is a diagram illustrating a display device according to another embodiment of the present invention.

Please refer to FIG. 3C. FIG. 3C is a diagram illustrating a display device 500 according to another embodiment of the present invention. One difference between the display device 500 and the display device 300 is that the display device 500 further comprises a second light source 308. The second light source 308 can be disposed, for instance, in proximity to a neighboring side or an opposite side of the first side of the display panel 304. The operation principle of the second light source 308 is similar to that of the first light source 306, so the relative description is omitted hereinafter. The present invention does not limit the display device 500 to comprising the first light source 306 and the second light source 308 only, meaning the display device 500 can comprise at least two light sources, where the operation principles of the at least two light sources are similar to the first light source 306, so the related description is omitted hereinafter. When the sensor array 3042 has sensed the generation of the reflective light (e.g. when brightness value of the reflective light is substantially greater than the predict value), the distance calculating unit 3102 calculates a distance Z between the object 312 and the display panel 304 according to a transmitting angle θ1 of the first light source 306, a transmitting angle θ2 of the second light source 308, the coordinate PP of the projection point and trigonometric theorem. Other operation principles of the display device 500 are similar to the display device 300, so the relative description is omitted hereinafter.

Figure 3D:
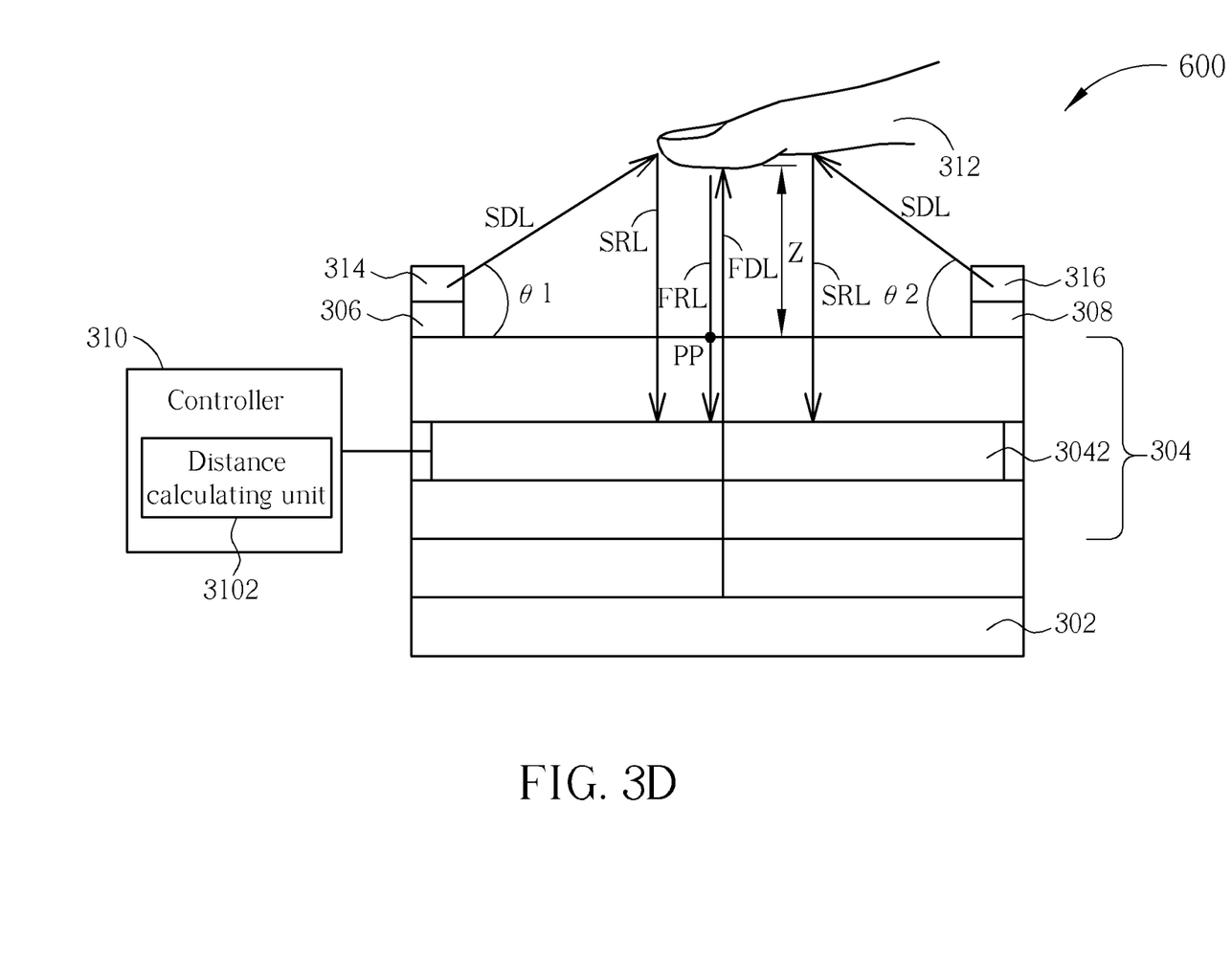
FIG. 3D is a diagram illustrating a display device according to another embodiment of the present invention.

Please refer to FIG. 3D. FIG. 3D is a diagram illustrating a display device 600 according to another embodiment of the present invention. One difference between the display device 600 and the display device 300 is that the display device 600 further comprises two optical modulators 314 and 316. The optical modulator 314 and the optical modulator 316 are disposed above the first light source 306 and the second light source 308 respectively, for altering transmitting angles of the second detection lights SDL generated by the first light source 306 and the second light source 308. The optical modulators 314 and 316 can be periodic diffraction gratings, micro electro mechanical systems (MEMS) or liquid crystal lens devices, etc. Other operation principles of the display device 600 are similar to the display device 500, so the related description is omitted hereinafter.

Figure 4A:
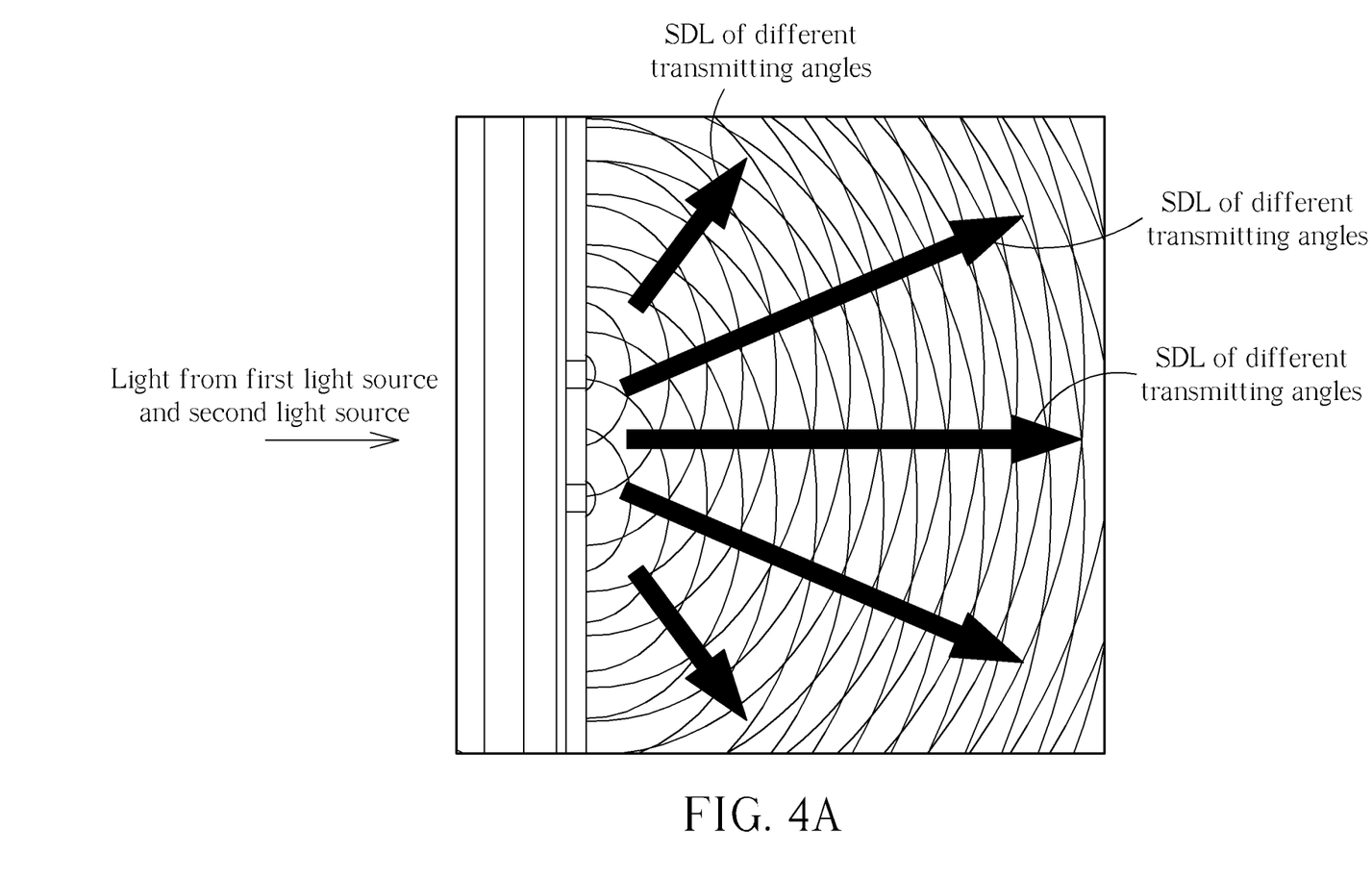
FIG. 4A is a diagram illustrating a periodic diffraction grating.
Figure 4B:
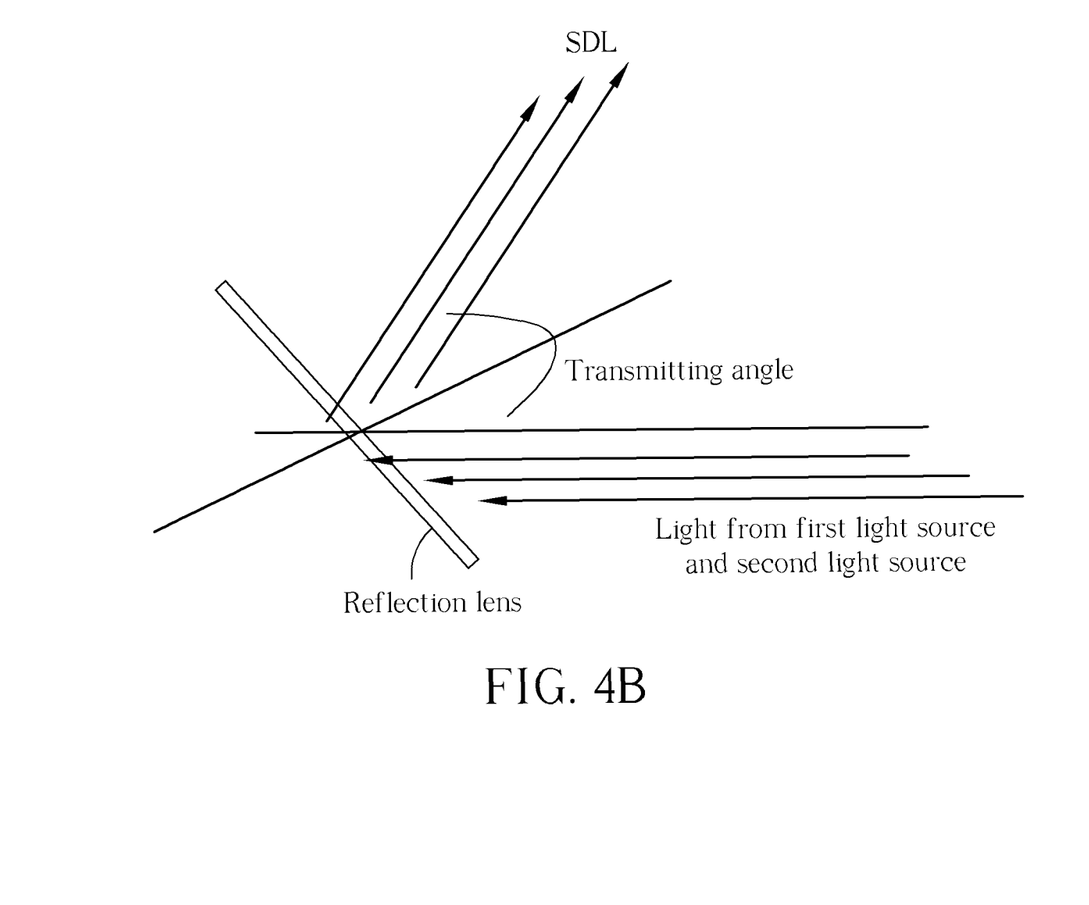
FIG. 4B is a diagram illustrating a micro electro mechanical system.
Figure 4C:
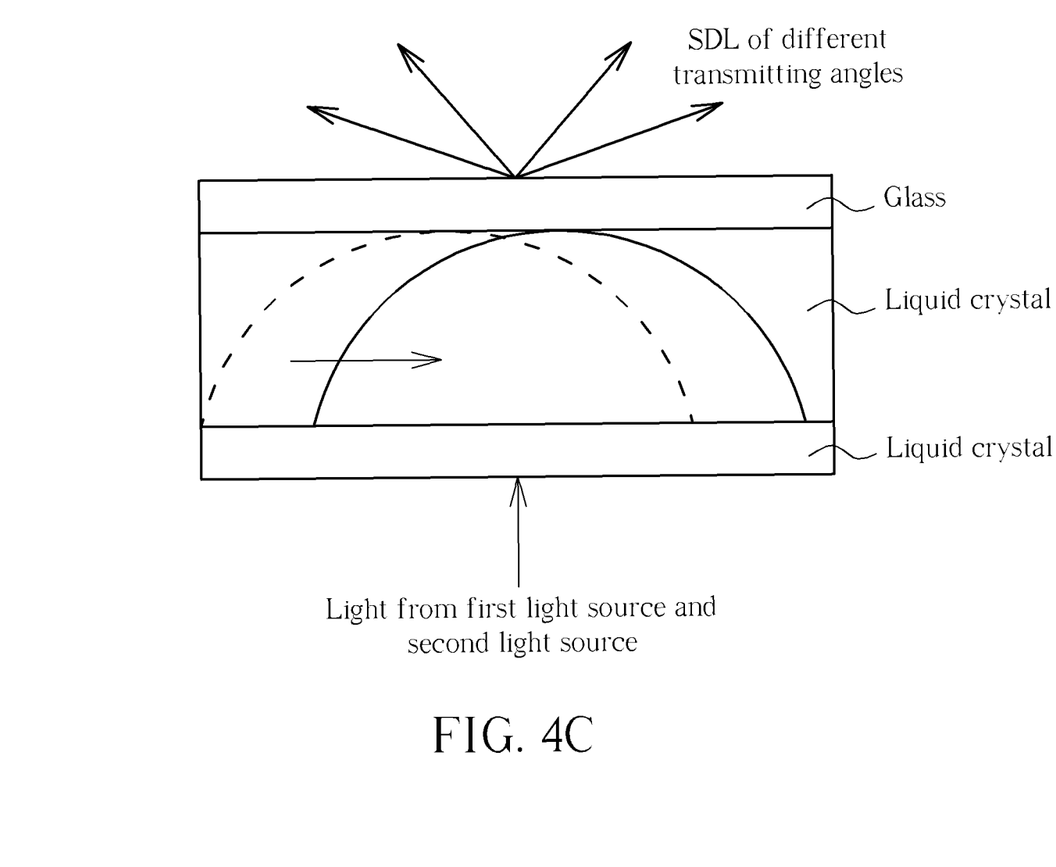
FIG. 4C is a diagram illustrating a liquid crystal lens device.

Please refer to FIG. 4A, FIG. 4B and FIG. 4C. FIG. 4A is a diagram illustrating a periodic diffraction grating. FIG. 4B is a diagram illustrating a micro electro mechanical system. FIG. 4C is a diagram illustrating a liquid crystal lens device. As shown by the periodic diffraction grating in FIG. 4A, changing a period of the diffraction grating changes a diffraction angle of the diffraction grating. Therefore, by arranging diffraction gratings of different periods, second detection light SDL of different transmitting angles can be generated. As shown in FIG. 4B, by changing a transmitting angle of the micro electro mechanical system (reflection lens), the micro electromechanical system can then reflect light coming from the first light source 306 and the second light source 308, so as to generate the second detection light of different transmitting angles accordingly. As shown in FIG. 4C, by changing a position of a liquid crystal lens of the liquid crystal lens device, the liquid crystal lens device can generate the second detection light SDL of different transmitting angles according to lights coming from the first light source 306 and the second light source 308.

Figure 5A:
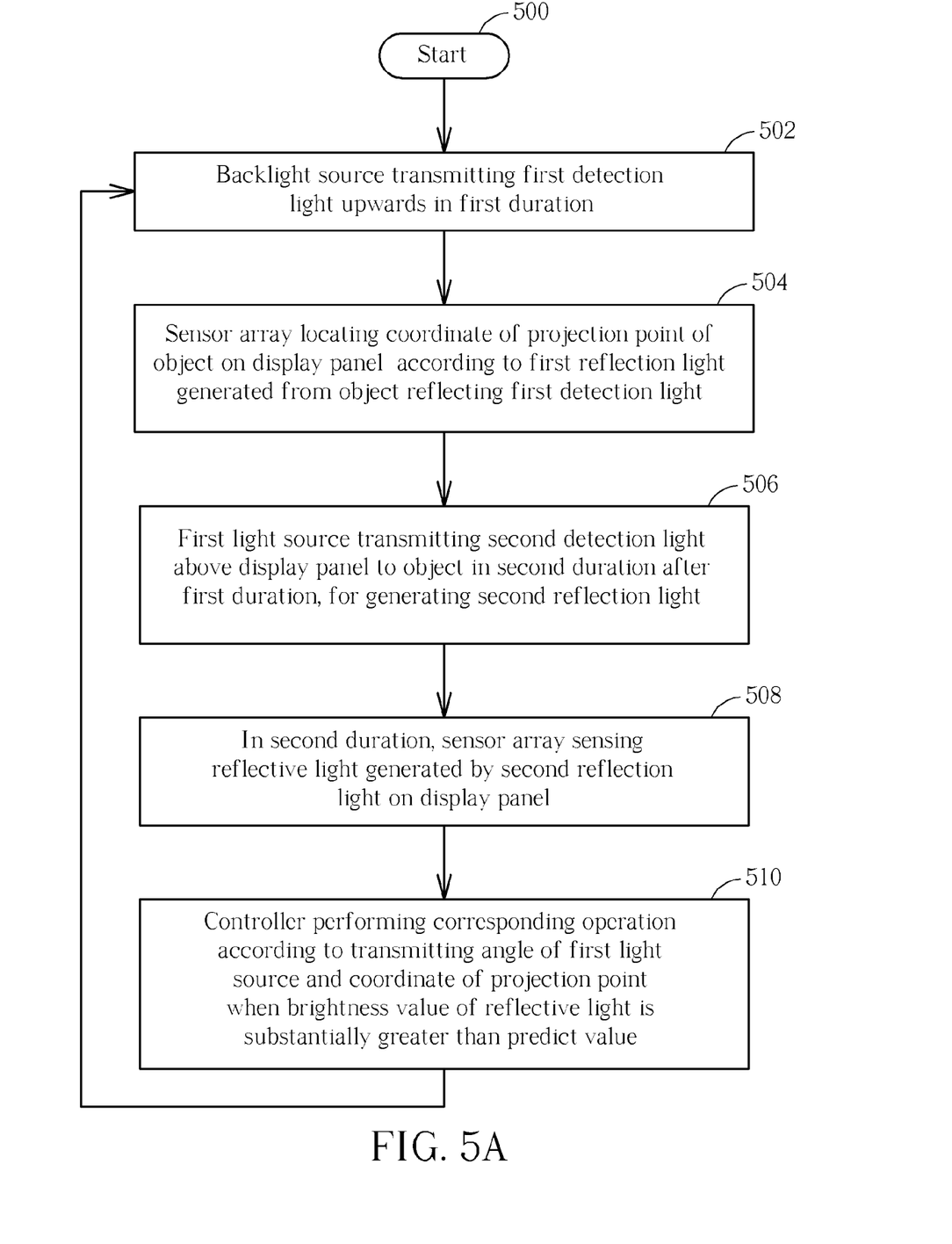
FIG. 5A is a flowchart illustrating a method of determining a position of an object applied to a three-dimensional interactive display according to another embodiment of the present invention.
Figure 5B:
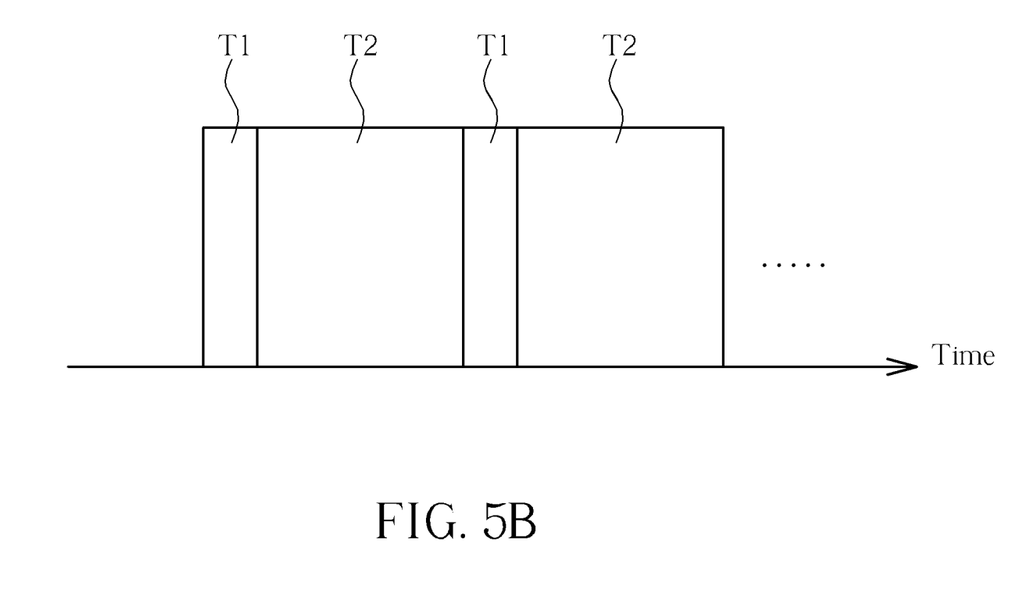
FIG. 5B is a diagram illustrating time sequences for FIG. 5A.

Please refer to FIG. 5A and FIG. 5B. FIG. 5A is a flowchart illustrating a method of determining a position of an object applied to a three-dimensional interactive display according to another embodiment of the present invention. FIG. 5B is a diagram illustrating time sequences for FIG. 5A. The method in FIG. 5A is explained in conjunction with the display device 300 in FIG. 3A. Steps of the method in FIG. 5A include:

Step 500: start;

Step 502: the backlight source 302 transmitting the first detection light FDL in a first duration T1;

Step 504: the sensor array 3042 locating the coordinate PP of the projection point of the object 312 on the display panel 304 according to the first reflection light FRL generated from the object 312 reflecting the first detection light FDL;

Step 506: the first light source 306 transmitting the second detection light SDL above the display panel 304 to the object 312 in a second duration T2 after the first duration T1, for generating the second reflection light SRL;

Step 508: in the second duration T2, the sensor array 3042 sensing the reflective light generated by the second reflection light SRL on the display panel 3042;

Step 510: the controller 310 performing a corresponding operation according to the transmitting angle θ1 of the first light source 306 and the coordinate PP of the projection point when a brightness value of the reflective light is substantially greater than a predict value; return to step 502.

Each step is explained in detail below. For step 504, in the first duration T1 (please refer to FIG. 5B), the first light source 306 turns off the second detection light SDL, and the sensor array 3042 locates the coordinate PP of the projection point of the object 312 on the display panel 304 according to the first reflection light FRL generated from the object 312 reflecting the first detection light FDL.

For step 506, in the second duration T2 (please refer to FIG. 5B), the backlight source 302 turns off the first detection light FDL and the first light source 306 repeatedly transmits the second detection light SDL of different transmitting angles (e.g. 5-70 degrees above the display panel 304) to the object 312 at different times within the second duration T2. The object 312 then reflects the second detection light SDL to generate the second reflection light SRL. Further, the first light source 306 is disposed in proximity to a first side of the display panel 304.

For step 508, in the second duration T2, the predict value can be the maximum or average brightness value obtained by the sensing array 3042 performing integration calculation on brightness of the second reflection light SRL being reflected to the display panel 304.

For step 510, when the sensing array 3042 has sensed the generation of the reflective light (e.g. when brightness value of the reflective light is substantially greater than the predict value), the distance calculating unit 3102 of the controller 310 calculates a distance Z between the object 312 and the display panel 304 according to a transmitting angle θ1 of the first light source 306, the coordinate PP of the projection point and trigonometric theorem. That is, the distance Z is the product of multiplying horizontal component x of the coordinate PP of the projection point by tan θ1. Therefore, the controller 310 can perform a corresponding operation according to the coordinate PP of the projection point of the object 312 on the display panel 304 and the distance Z between the object 312 and the display panel 304.

Figure 5C:
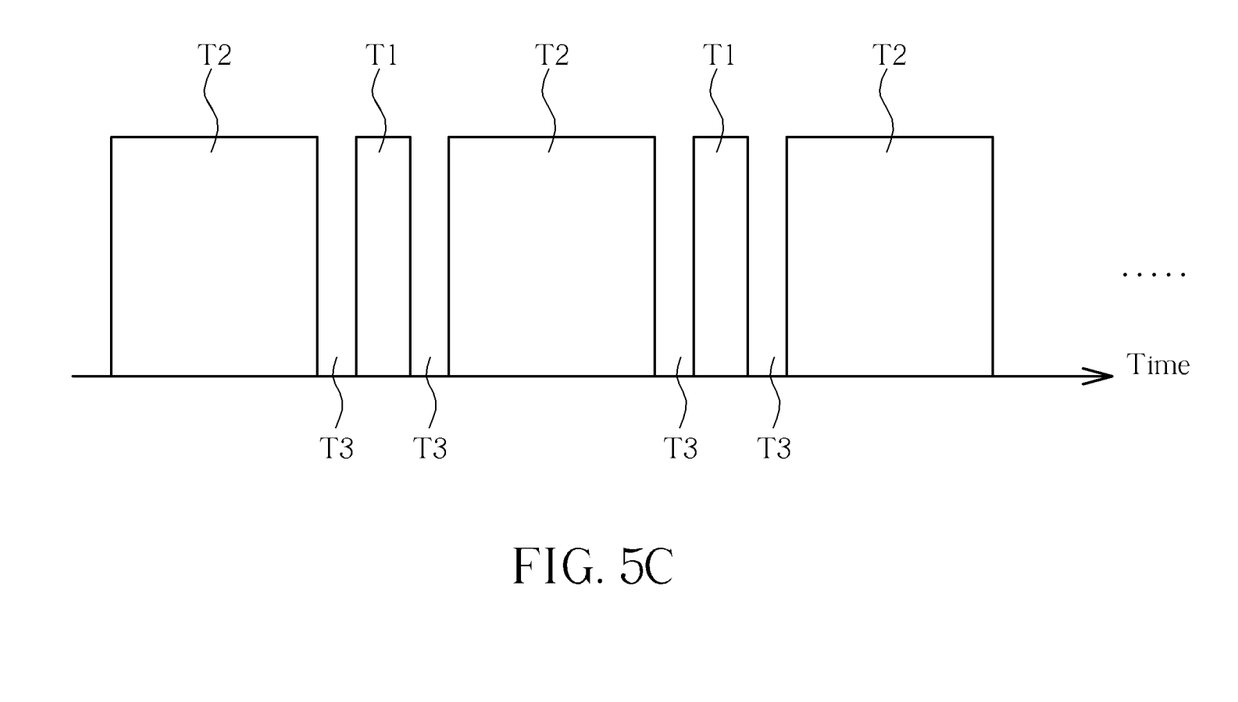
FIG. 5C is a diagram illustrating time sequences according to another embodiment of the present invention.

Please refer to FIG. 5C. FIG. 5C is a diagram illustrating time sequences according to another embodiment of the present invention. As shown in FIG. 5C, the other embodiment of the present invention further comprises a third duration T3 between the first duration T1 and the second duration T2, where the third duration T3 is for resetting the display device 300. Resetting the display device means letting the sensor array be in an initial state without sensing any values. Other operation principles of the embodiment shown in FIG. 5C are similar to the embodiment shown in FIG. 5A, so the relative description is omitted hereinafter.

In conclusion, the display device and the method of determining a position of an object applied to a three-dimensional interactive display of the present invention utilize a backlight source to transmit first detection light in a first duration to detect the object, for locating a coordinate of a projection point of the object on the display panel, and utilize a first light source to repeatedly transmit second detection light of different transmitting angles from a side of the display panel to sense the object at different times within a second duration, for the sensor array to sense the reflective light. The distance calculating unit calculates a distance between the object and the display panel, according to a transmitting angle of the first light source corresponding to the reflective light, a coordinate of the projection point of the object on the display panel, and trigonometric theorem. The controller can then perform a corresponding operation according to the coordinate of the projection point of the object on the display panel and the distance between the object and the display panel. Therefore, the present invention can provide interactivity near the display panel, as well as reducing size of the display device (meaning the user does not require additional sensing devices). Further, the present invention only needs to deploy a device (e.g. a periodic diffraction grating, a micro electro mechanical system (MEMS) or a liquid crystal lens, etc.) that can alter the transmitting angle of the first light source, and a resolution for a distance in the Z direction can be increased by the device that changes the transmitting angle of the first light source, without increasing size of the display device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display, comprising:
   a backlight source;
   a display panel, disposed above the backlight source, wherein the display panel comprises:
      a sensor array, for sensing first reflection light, wherein the first reflection light is generated from an object reflecting first detection light, wherein the first detection light is generated by the backlight source, and the first reflection light is configured to locate a coordinate of a projection point of the object on the display panel;
   a first light source, disposed adjacent to a first side of the display panel, for repeatedly transmitting second detection light of different transmitting angles to the object at different time to generate second reflection light, wherein the second reflection light is sensed by the sensor array; and
   a controller, for performing a corresponding operation according to the transmitting angle of the first light source and the coordinate of the projection point when brightness value of the second reflection light is substantially greater than a predict value;
   wherein the predict value is an average brightness value or a maximum brightness value obtained by utilizing the sensing array to perform an integration calculation on brightness of the second reflection light on the display panel.

2. The display of claim 1, further comprising:
a first optical modulator, disposed in proximity to the first light source, wherein the first optical modulator is configured to repeatedly change the direction of the second detection light of different transmitting angles at different time.

3. The display of claim 2, further comprising a second light source, disposed in proximity to a neighboring side or an opposite side of the first side of the display panel.

4. The display of claim 3, wherein each of the first light source and the second light source is an infrared light source or a visible light source.

5. The display of claim 3, further comprising:
a second optical modulator, disposed in proximity to the second light source.

6. The display of claim 5, wherein each of the first optical modulator and the second optical modulator comprise at least one of a periodic diffraction grating, a micro electro mechanical system (MEMS) or a liquid crystal lens device.

7. The display of claim 1, wherein the transmitting angles are substantially between about 5 to 70 degrees.

8. The display of claim 1, wherein the controller comprises a distance calculating unit, for calculating a distance between the object and the display panel according to the transmitting angle and the coordinate of the projection point, and the controller performs the corresponding operation according to the distance between the object and the display panel.

9. The display of claim 1, wherein the sensor array is embedded in the display panel.

10. A method of determining a position of an object, comprising:
a backlight source transmitting first detection light in a first duration;
a sensor array locating a coordinate of a projection point of the object on a display panel according to first reflection light generated from the object reflecting the first detection light;
at least one first light source transmitting at least one second detection light to the object in a second duration after the first duration, for generating at least one second reflection light, wherein the at least one first light source is disposed in at least one side of the display panel;
the sensor array sensing the at least one second reflection light in the second duration; and
performing a corresponding operation in the second duration according to at least one transmitting angle of the at least one first light source and the coordinate of the projection point when brightness value of the at least one second reflection light is substantially greater than a predict value;
wherein the predict value is an average brightness value or a maximum brightness value obtained by utilizing the sensing array to perform an integration calculation on brightness of the second reflection light on the display panel.

11. The method of claim 10, wherein the step of transmitting the at least one second detection light to the object comprises:
a first optical modulator changing the direction of the at least one second detection light of different transmitting angles at different time.

12. The method of claim 10, wherein a sensing frequency of the sensing array is the same as a transmitting frequency of the first light source transmitting the second detection light.

13. The method of claim 10, wherein the first detection light and the second detection light are not turned on or turned off at the same time.

14. The method of claim 10, wherein performing the corresponding operation in the second duration comprises:
calculating a distance between the object and the display panel according to the at least one transmitting angle and the coordinate of the projection point.

15. The method of claim 10, further comprising resetting the display device in a third duration between the first duration and the second duration, wherein resetting the display device means letting the sensor array be in an initial state without sensing any values.

16. The method of claim 10, further comprising:
the backlight source transmitting the first detection light again after the second duration.

17. A display, comprising:
a backlight source;
a display panel, disposed above the backlight source, wherein the display panel comprises:
a sensor array, for sensing first reflection light, wherein the first reflection light is generated from an object reflecting first detection light , wherein the first detection light is generated by the backlight source, and the first reflection light is configured to locate a coordinate of a projection point of the object on the display panel;
a first light source, disposed adjacent to a first side of the display panel, for repeatedly transmitting second detection light of different transmitting angles to the object at different time to generate second reflection light, wherein the second reflection light is sensed by the sensor array; and
a controller, for performing a corresponding operation according to the transmitting angle of the first light source and the coordinate of the projection point when brightness value of the second reflection light is substantially greater than a predict value, wherein the controller comprises a distance calculating unit, for calculating a distance between the object and the display panel according to the transmitting angle and the coordinate of the projection point, and the controller performs the corresponding operation according to the distance between the object and the display panel.

* * * * *